United States Patent [19]

Ishii

[11] Patent Number: 5,051,149
[45] Date of Patent: Sep. 24, 1991

[54] TIRE BUILDING APPARATUS INCLUDING BEAD SUPPLY MEANS FOR BEAD SETTERS

[75] Inventor: Ryutaro Ishii, Higashimurayama, Japan

[73] Assignee: Bridgestone Corporation, Tokyo, Japan

[21] Appl. No.: 527,913

[22] Filed: May 24, 1990

[30] Foreign Application Priority Data

Jun. 3, 1989 [JP] Japan .................................. 1-141481

[51] Int. Cl.⁵ .............................................. B29D 30/32
[52] U.S. Cl. .................... 156/403; 156/406.2; 156/414
[58] Field of Search ............ 156/396, 398, 403, 406.2, 156/414-420

[56] References Cited

U.S. PATENT DOCUMENTS

| | | | |
|---|---|---|---|
| 3,556,900 | 1/1971 | Edney et al. ......................... | 156/403 |
| 4,430,143 | 2/1984 | Aihara ................................. | 156/403 |
| 4,581,084 | 4/1986 | Mukae et al. ....................... | 156/403 |

FOREIGN PATENT DOCUMENTS 57-32935  2/1982  Japan .
57-42503  9/1982  Japan .
58-50586  11/1983  Japan .

*Primary Examiner*—Geoffrey L. Knable
*Attorney, Agent, or Firm*—Sughrue, Mion, Zinn, Macpeak & Seas

[57] ABSTRACT

A tire building apparatus includes a forming drum rotatably supported with its one end and having an outer circumference around which a tire constituting member is wound, and bead setters for setting beads in position on the tire constituting member. The apparatus further includes bead supply device having a holder fixed to a forward end of a main shaft of the forming drum and a plurality of grasping pawls supported by the holder and radially movable toward and away from an axis of the main shaft in synchronism with each other to be able to grasp the beads on inside thereof. With this arrangement, beads are brought into exact alignment with the forming drum to eliminate contact of the beads with the tire constituting member in setting the beads. As a result, damaging of the tire constituting member can be prevented to improve yield rate of tire building.

3 Claims, 5 Drawing Sheets

FIG_1

FIG_3
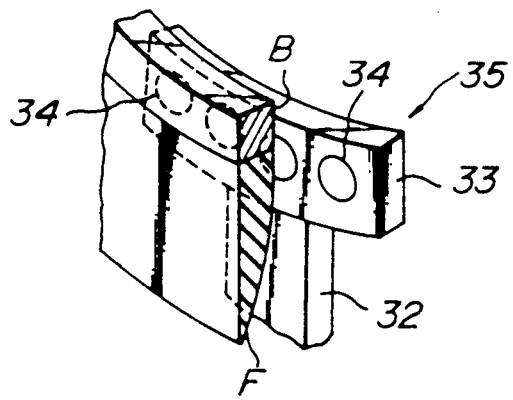
FIG_5
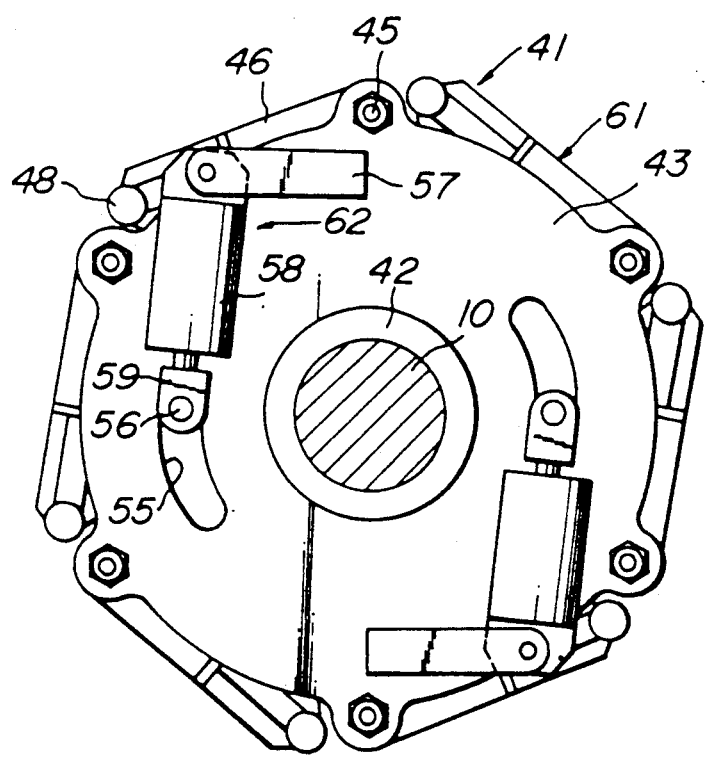

FIG_4
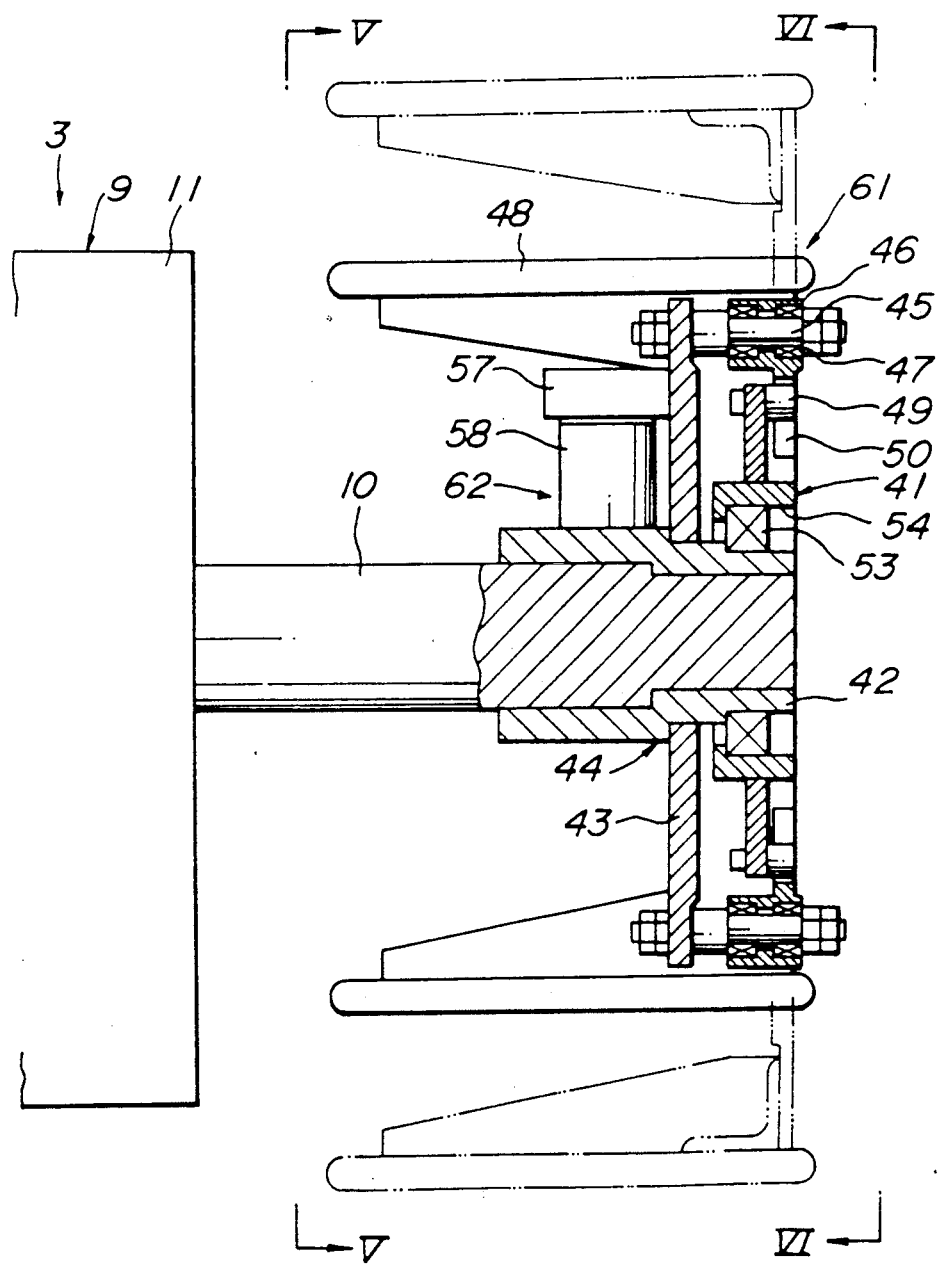

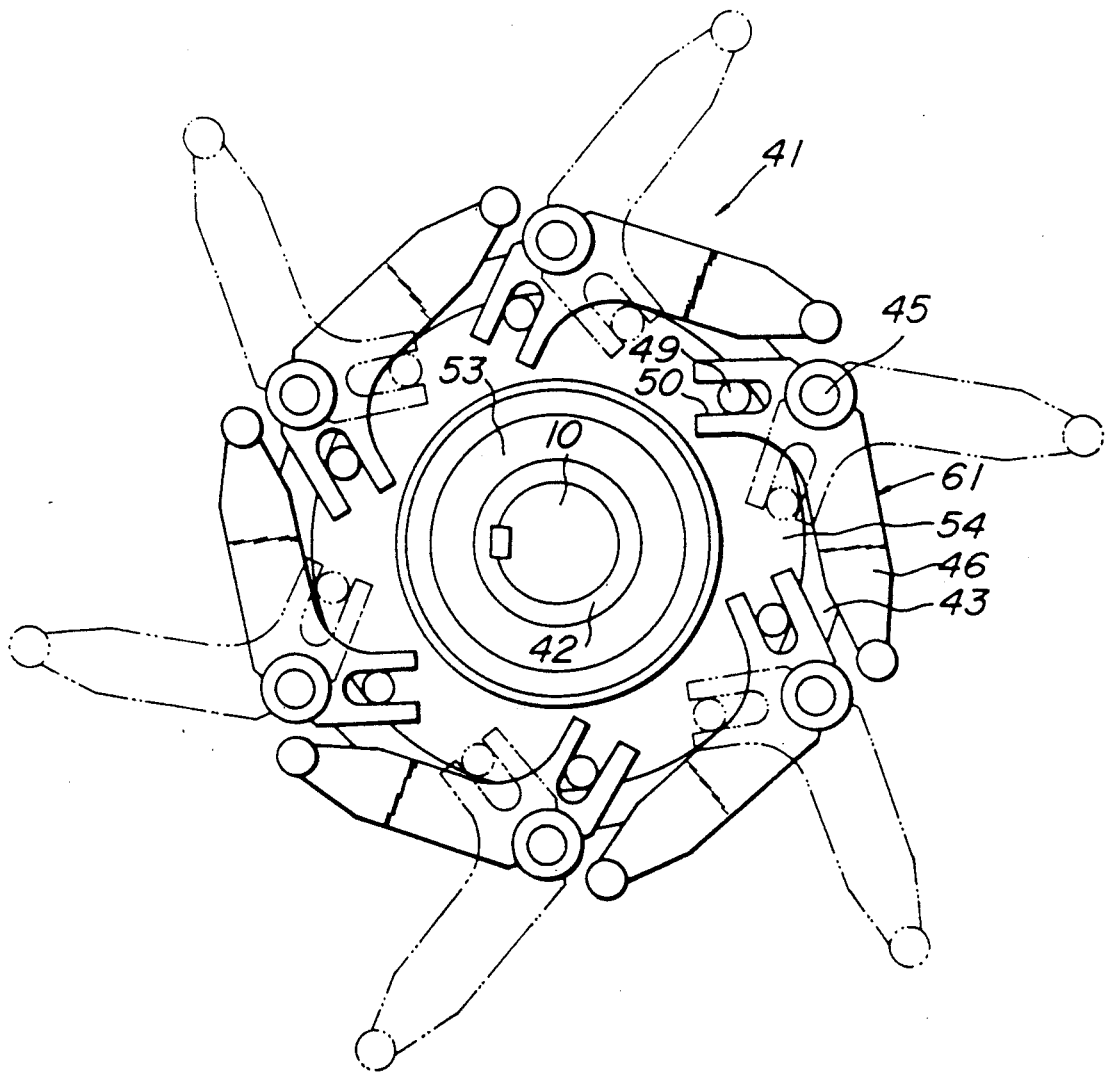
FIG_6

TIRE BUILDING APPARATUS INCLUDING BEAD SUPPLY MEANS FOR BEAD SETTERS

BACKGROUND OF THE INVENTION

This invention relates to a tire building apparatus having a forming drum, bead setters and bead supply means.

A tire building apparatus hitherto used has been known, for example, disclosed in Japanese Patent Application Laid-open No. 57-32,935. This apparatus comprises a tire forming drum rotatably supported at one end and having an outer circumference about which a tire constituting member is wound. The apparatus further comprises bead setters movable toward and away from the forming drum for holding beads and setting them in position on the tire constituting member, and bead supply means for supplying the beads to the bead setters. The bead supply means is arranged remote from the forming drum and the bead setters. The apparatus further comprises a base movable across passages of the bead setters, a pair of front plates fixed to the base, and a plurality of bead chucks circumferentially spaced and supported by the front plates and movable in radial directions in synchronism with each other to grasp the beads on their inside.

With such a tire building apparatus, however, as the bead supply means is independently located remote from the tire forming drum, the beads grasped by the bead supply means and hence the beads held by the bead setters are shifted from or misaligned with the forming drum because accumulation of manufacturing errors, positioning errors and deformations of the forming drum. In case that they are misaligned to an excessive extent, in fitting beads on the outside of the forming drum to set the beads in position on the tire constituting member, the beads are likely to contact the tire constituting member to damage it to an extent that it can seldom be repaired.

SUMMARY OF THE INVENTION

It is an object of the invention to provide a tire building apparatus which completely eliminates a risk of beads and a tire constituting member coming into contact with each other in setting the beads.

In order to accomplish this object, in a tire building apparatus including a forming drum rotatably supported with its one end and having an outer circumference around which a tire constituting member is wound, and bead setters for setting beads in position on the tire constituting member, according to the invention the apparatus comprises bead supply means having a holder fixed to a forward end of a main shaft of the forming drum and a plurality of grasping pawls supported by the holder and radially movable toward and away from an axis of the main shaft in synchronism with each other to be able to grasp the beads on inside thereof.

In operating the tire building apparatus according to the invention, first a tire constituting member is wound around the forming drum, while the forming drum is being rotated. Beads are then brought into positions about the grasping pawls of the bead supply means and the grasping pawls are then moved radially outwardly in synchronism with each other until the grasping pawls abut against inner circumferences of the beads. As the result, the beads are grasped on their inside by the grasping pawls. In this case, the holder supporting the grasping pawls is fixed to a forward end of the main shaft of the forming drum and the grasping pawls are movable in synchronism with each other in radial directions toward and away from an axis of the main shaft of the forming drum. As a result, the beads grasped on the inside by the grasping pawls are brought into exact alignment with the forming drum.

Thereafter, the beads are supplied to the bead setters and then set in position on the tire constituting member. As the bead has exactly aligned with the forming drum from the stage where the beads are grasped by the bead supply means, the beads are exactly aligned with the forming drum at the stage where they are supplied to the bead setters. As a result, the beads do not contact the tire constituting member on the forming drum in setting the beads. Therefore, damaging of the tire constituting member due to contact of the beads with the tire constituting member can be prevented and the yield rate of the tire building can be improved.

The invention will be more fully understood by referring to the following detailed specification and claims taken in connection with the appended drawings.

BRIEF DESCRIPTION OF THE DRAWINGS

FIG. 3 is a perspective view illustrating the proximity of the arcuate segment of the bead setter;

FIG. 4 is a front sectional view illustrating the proximity of the bead supply means shown in FIG. 1;

FIG. 5 is a sectional view taken along the line V—V in FIG. 4; and

FIG. 6 is a side elevation viewed in the direction of arrows VI in FIG. 4.

EXPLANATION OF THE PREFERRED EMBODIMENT

Figure 1:
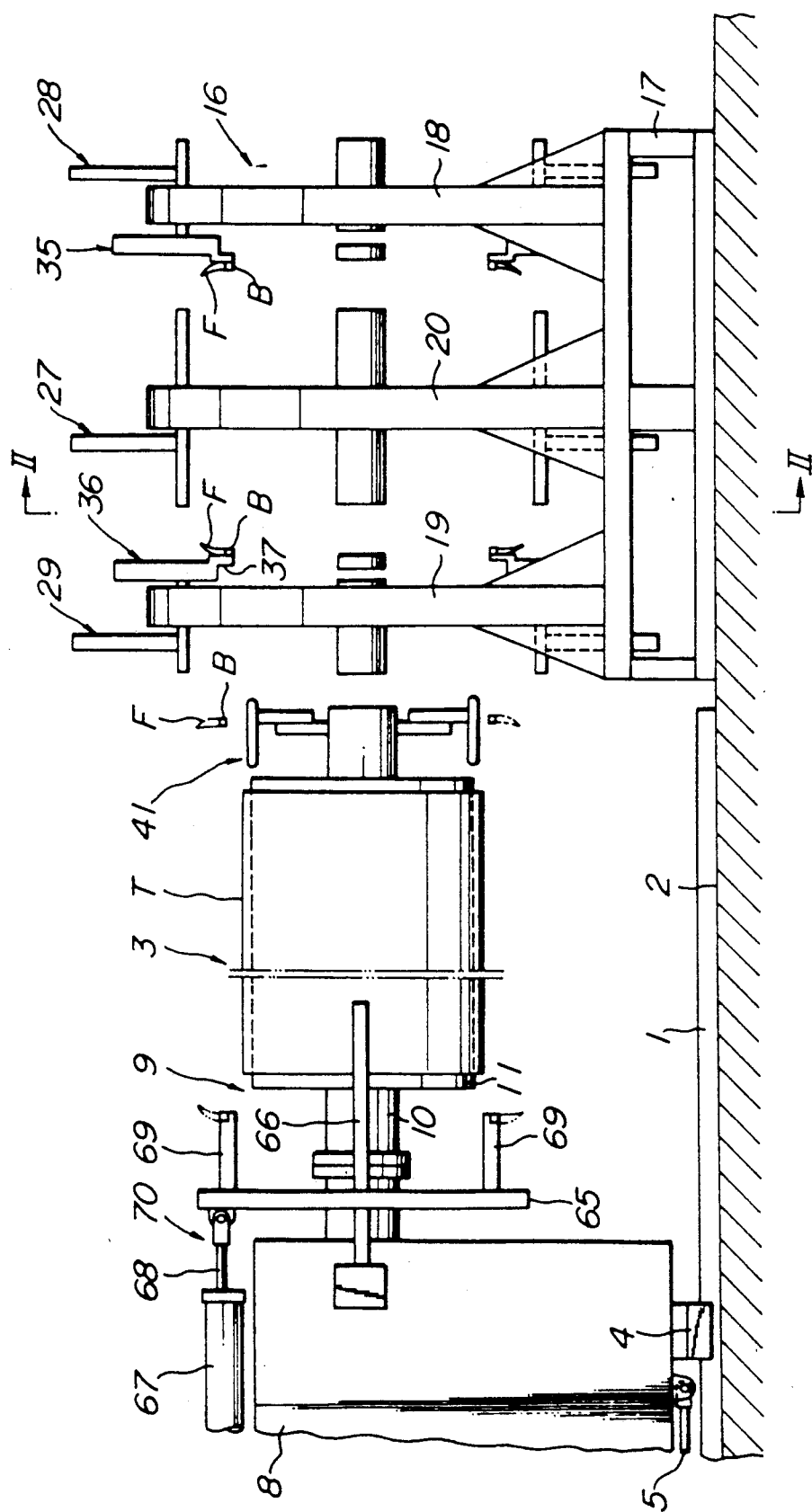
FIG. 1 is a schematic front elevation illustrating one embodiment of the invention.

Referring to FIG. 1, rails 1 are arranged on a floor 2 so as to extend in a direction from the left to the right as viewed in the drawing. Slide bearings 4 fixed to a forming unit 3 are slidably engaged on the rails 1. Reference numeral 5 denotes a piston rod of a cylinder as a toward and away driving mechanism. A forward end of the piston rod 5 is connected to the forming unit. As a result, when the cylinder is actuated to extend or retract the piston rod 5, the forming unit 3 is moved along the rails 1 in their extending directions. The forming unit 3 comprises a driving portion 8 and a horizontal forming drum 9 rotatably supported with its rear end by the driving portion 8. The forming drum 9 is rotatively driven by the driving portion 8 and is adapted to be wound thereabout by tire constituting members T such as inner liners, carcasses or the like. The forming drum 9 has a main shaft 10 located at its center and an expansible and contractible cylindrical drum portion 11 arranged in a manner surrounding the main shaft 10.

Figure 2:
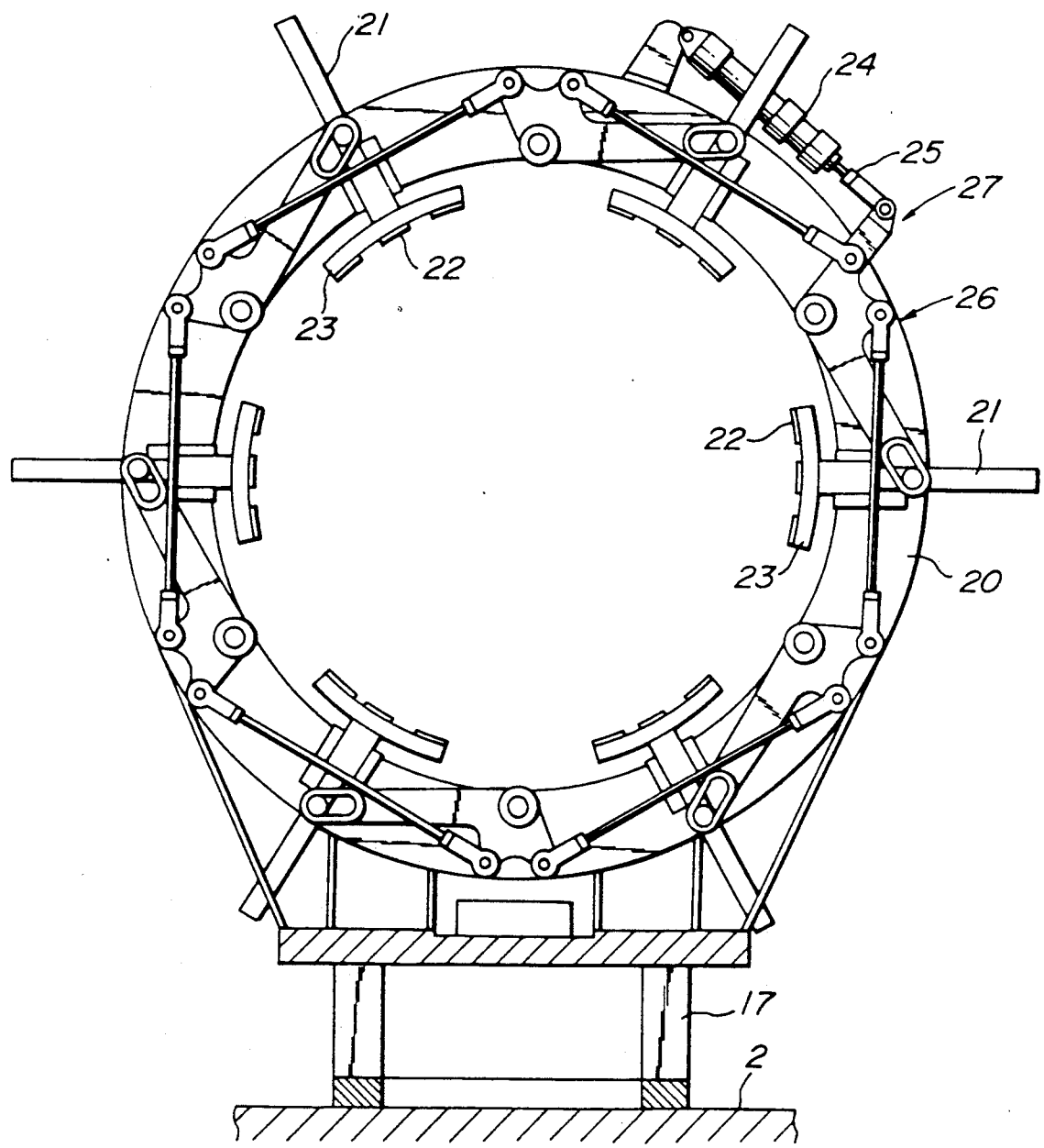
FIG. 2 is a sectional view taken along the line II—II in FIG. 1.

Referring to FIGS. 1 and 2, a band bead supply unit 16 is provided on the floor 2 in front of the forming unit 3. Coaxial support rings 18, 19 and 20 are mounted on front and rear ends and a center of a frame 17 of the band bead supply unit 16. A plurality of radially movable holders 21 are supported by the center support ring 20 and circumferentially equally spaced apart from each other. Each of the holders 21 has an arcuate segment 23 provided on its inner surface with permanent magnets 22. To the support ring 20 is connected a cylinder 24 having a piston rod 25 whose rod end is connected through a link mechanism 26 to the holders 21. When the piston rod 25 of the cylinder 24 is extended, all the holders 21 are radially inwardly moved in synchronism with each other, so that a tire constituting member T wound about the forming drum 9 is held with its axial center portion by attractive force of the magnets 22 from the outside of the member T.

The holders 21, the cylinder 24 and the link mechanism 26 form as a whole a holding mechanism 27 for receiving the tire constituting member T from the forming drum 9 and holding the member T with its axial center by the attractive force. Moreover, the support rings 18 and 19 are also provided with holding mechanism 28 and 29 similar in construction to the holding mechanism 27. The holding mechanism 28 and 29 receive the cylindrical tire constituting member T from the forming drum 9 and hold the member T with its front and rear ends by the attractive force from the outside of the member T.

A plurality of holders 32 as shown in FIGS. 1 and 3 are fixed to the support ring 18 on the side facing inwardly. Each of the holders 32 is provided at its inner end with an arcuate segment 33 fixed thereto. The arcuate segment 33 has a plurality of magnets 34 embedded in its inner surface for holding a bead B with a filler F by attractive force. The holders 32 and the arcuate segments 33 form as a whole a front bead setter 35 for holding the bead B with the filler F and setting them in position (on outside of the front end) on a front portion of the tire constituting member T the front portion being that portion which is located furthest from the end of the shaft 10 supported by the driving portion 10. The bead setter 35 is movable toward and away from the forming drum 9 when the forming drum 9 moves in its axial directions.

On the other hand, a rear bead setter 36 similar in construction to the bead setter 35 is also provided on an inner surface of the support ring 19. Arcuate segments 37 of the bead setter 36 are moved in radial directions in synchronism with each other by a moving mechanism (not shown). The bead setter 36 is also to hold the bead B with the filler F and to set them in position (on outside of the rear end) on a rear portion of the tire constituting member T.

Referring to FIGS. 1, 4, 5 and 6, bead supply means 41 is mounted onto a forward end of the main shaft 10 of the forming drum 9 for supplying the bead B with the filler F to the front bead setter 35. The bead supply means has a sleeve 42 fixed to the forward end of the main shaft 10 and a disk 43 fixed to an outer surface of the sleeve 42. The sleeve 42 and disk 43 form as a whole a holder 44 fixed to the forward end of the main shaft 10.

A plurality (six in this embodiment) of pins 45 are fixed to radially outer end of the disk 43 and circumferentially equally spaced apart from each other and in parallel with the main shaft 10. The pins 45 pivotally support L-shaped rocking arms 46 at their bent portions through bearings 47, respectively. To an outer end of each of the rocking arms 46 is fixed an abutting bar 48 in parallel with the main shaft 10, while the other end or inner end of the rocking arm 46 is formed with a slit 50 for fitting a roller 49 therein. The roller 49 is rotatably supported by rotating member 54 supported through bearing 53. To the rotating member 54 are fixed connecting shafts 56 passing through a plurality of arcuate slots 55 formed in the disk 43.

A plurality of brackets 57 are fixed to the disk 43. Head ends of cylinders 58 are connected to the brackets 57, respectively. Each of the connecting shafts 56 is connected to a rod end of a piston rod 59 of each of the cylinders 58. As a result, when the cylinders 58 are actuated, the rocking arms 46 are rocked in synchronism with each other so that the outer ends of the rocking arms 46 and the abutting bars 48 are moved in radial directions. The rocking arms 46 and the abutting bars 48 form as a whole a plurality of grasping pawls 61 circumferentially spaced and supported by the holder 44. These grasping pawls 61 are movable in radial directions in synchronism with each other about the main shaft 10 and when moved radially outwardly, the grasping pawls 61 grasp the bead B with the filler F on the inside thereof. Moreover, the rollers 49, the rotating member 54, the connecting shafts 56 and the cylinders 58 form as a whole a moving mechanism 62 for causing the grasping pawls 61 to move in the radial directions synchronized with each other.

Referring to FIG. 1, a supply ring 65 is arranged which is positioned between the driving portion 8 and the drum 11 when in an awaiting position. A guide rod 66 is fixed to a side surface of the driving portion 8 and in parallel with the main shaft 10 and passes through the supply ring 65. To an upper surface of the driving portion 8 is connected a cylinder 67 having a piston rod 68 whose end is connected to the supply ring 65. A plurality of grasping pawls 69 are secured to a forward surface of the supply ring 65 and circumferentially equally spaced from each other. The supply ring 65, the guide rod 66 and the grasping pawls 69 form as a whole supply means 70 for grasping the bead B with the filler F on inside thereof and supplying them to the bead setter 36.

The operation of the apparatus of the embodiment according to the invention will be explained hereinafter.

It is now assumed that the piston rod 5 of the cylinder is retracted and the forming unit 3 is positioned rearwardly of and separately from the band bead supply unit 16. The forming drum 9 is then rotated by the driving portion 8 and a tire constituting member T is supplied to the forming drum 9 so that the member T is wound about the forming drum 9. Thereafter, a bead B with a filler F is charged and held by grasping pawls 69 of the supply means 70 by an operator as shown in phantom lines in FIG. 1 and transferred to a position around the grasping pawls 61 of the bead supply means 41. The piston rods 59 of the cylinders 58 are extended to rotate the rotating member 54 together with the rollers 49. As a result, all the rocking arms 46 are rocked about the pins 45 in synchronism with each other so that outer ends of the grasping pawls 61 are moved radially outwardly in synchronism with each other. Such radially outward movements of the outer ends of the grasping pawls 61 are stopped when all the grasping pawls 61 have abutted against the inner circumferential surface of the bead B. In this case, the bead B grasped on the inside by the grasping pawls 61 are exactly aligned with an axis of the forming drum 9 because the holder 44 supporting the grasping pawls 61 are fixed to the front end of the main shaft 10 and the grasping pawls 61 are able to perform synchronized radial movements toward and away from the main shaft 10.

The piston rod 68 of the cylinder 67 is then extended to move the supply ring 65, the grasping pawls 69 and the bead B are moved to the axial center of the forming drum 9. Thereafter, the piston rod 5 of the cylinder is extended to move the forming unit 3 forwardly along the rails 1. As a result, the forming drum 9 approaches the band bead supply unit 16 and then enters thereinto. In this case, in order to avoid any interference of the bead setter 36 with the bead supply means 41 and the forming drum 9, the arcuate segments of the bead setter 36 have been retracted radially outwardly.

On the way of the movement of the forming unit 3, the bead B with the filler F held by the supply means 70 pass through the bead setter 36 and move to a forward position thereof. Thereafter, by the movement of the forming unit 3 the bead supply means 41 passes in the bead setter 35. In this passage, the bead B with the filler F grasped by the bead supply means 41 will abut against the arcuate segments 33 of the bead setter 35 and is attracted by the magnets 34, with the result that the bead B is removed from the grasping pawls 61 and transferred to the bead setter 35.

In this transference, as the bead B is supplied from the bead supply means 41 to the bead setter 35 under the aligned condition with the forming drum 9, so that the alignment can be maintained even after supplied to the bead setter 35. In this case, even if the bead B is somewhat inclined relative to a plane perpendicularly intersecting the main shaft 10 due to mishandling of the bead B with respect to the bead supply means 41, the bead B is brought into good positions so as to be coincident with the plane perpendicularly intersecting the main shaft 10 inasmuch as the forming unit 3 continues its movement after the abutment of the bead B against the bead setter 35 so that the bead B is attracted over all circumferences by the magnets 34.

The beads B are supplied from the bead supply means 41 to the bead setters 35 in this manner. After supplied, the forming unit 3 continues its movement so that the drum portion 11 and the tire constituting member T enter the bead B with the filler F. In this case, as the bead B is exactly aligned with the forming drum 9 as above described, no longer is there any interference of the bead B with the tire constituting member T. Any damaging of the tire constituting member T caused by contact of the beads B is prevented in this manner to improve the yield rate of tire building.

The forming unit 3 continues its movement even after the bead B is supplied to the bead setter 35 as above described. This movement of the forming unit 3 is stopped when the bead B held by bead setter 35 has arrived at somewhere about a predetermined setting position at the forward end of the tire constituting member T. At the moment, the bead setter 36 has arrived about a predetermined setting position at the rearward end of the tire constituting member T and the holding mechanism 27 has arrived about the center of the tire constituting member T. Moreover, the holding mechanisms 28 and 29 have arrived about the forward and rearward ends of the tire constituting member T. Thereafter, the arcuate segments 37 are moved radially inwardly to reduce a diameter of a phantom circle formed by the arcuate segments 37 so as to be able to attract the bead B held by the supply means 70. In this case, as the arcuate segments 37 of the bead setting mechanism 36 and the grasping pawls 69 of the supply means 70 are circumferentially alternately arranged, the arcuate segments 37 and the grasping pawls 69 do not interfere with each other.

The piston rod 68 of the cylinder 67 is then retracted, the bead B grasped by the grasping pawls 69 is moved rearwardly. On the way of the rearward movement, the bead B will abut against the arcuate segments 37 of the bead setter 36. As a result, the bead B with the filler F is attracted to the arcuate segments 37 so as to be transferred from the supply means 70 to the bead setter 36. In this case, even if the bead B with the filler F is somewhat inclined relative to the plane perpendicularly intersecting the main shaft 10, this inclination of the bead B is compensated for as above described.

Thereafter, the cylinders 24 of the holding mechanism 27, 28 and 29 are actuated to move the arcuate segments 23 radially inwardly so that the tire constituting member T wound about the forming drum 9 is held on the outside thereof by the holding mechanisms 27, 28 and 29. In this case, the cylinders 58 are actuated to rock all the rocking arms 46 in synchronism with each other so that grasping pawls 61 are moved radially inwardly to their initial positions. The forming drum 9 is then contracted or the diameter of the forming drum 9 is reduced. Thereafter, the piston rod 5 of the cylinder is retracted to move the forming unit 3 rearwardly to its initial position.

A separate forming drum (not shown) arranged forwardly of the band bead supply unit 16 is moved rearwardly so as to enter the cylindrical tire constituting member T held by the band bead supply unit 16. The separate forming drum is expanded or the diameter thereof is enlarged to transfer the tire constituting member T from the holding mechanisms 27, 28 and 29 to the separate forming drum, while the bead B with the filler F is transferred from the bead setters 35 and 36 into a predetermined setting position and set therein. Thereafter, the holding mechanisms 27, 28 and 29 are expanded or the diameters of these mechanisms are enlarged and the forming drum is moved forwardly.

The above is one cycle of the operation of the embodiment of the apparatus according to the invention. Thereafter, this cycle is repeatedly performed.

In the above embodiment, moreover, the bead setters 35 and 36 are formed integrally with the holding mechanisms 27, 28 and 29 holding the tire constituting member T. However, the bead setters may be independent from the holding mechanisms, or may be integrally formed with a so-called can for folding bladders. Further, although the grasping pawls 61 are moved in radial directions by rocking the rocking arms 46 in the above embodiment, grasping pawls may be driven linearly in radial directions in a plurality of radially extending guide grooves formed in the holder according to the invention.

Moreover, although the forming drum 9 is moved relative to the stationary bead setter 35 so that they are move toward and away from each other in the above embodiment, the bead setter may be moved to the stationary forming drum according to the invention.

As can be seen from the above explanation, according to the invention beads are brought into exact alignment with the forming drum to eliminate contact of beads with a tire constituting member in setting the beads. As a result, damaging of the tire constituting member can be prevented to improve the yield rate of tire building. Moreover, as the beads grasped by the bead supply means are automatically transferred from the grasping pawls to the bead setter, the productivity can be improved in addition to the improvement of the quality of produced tires.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A tire building apparatus comprising a main shaft having a first end supported by a driving means and a second end, a forming drum rotatably supported by said main shaft between said first and second ends and having an outer circumference around which a tire constituting member is wound, front and rear bead setters for setting beads in position on front and rear portions of the wound tire constituting member, respectively, bead supply means having a holder fixed to said second end of said main shaft of the forming drum and a plurality of circumferentially spaced rasping pawls supported by the holder and radially movable toward and away from an axis of the main shaft in synchronism with each other to be able to grasp a bead on an inside thereof, wherein said bead supply means is adapted to supply said grasped bead to said front bead setter for subsequent setting in position on said front portion of the wound tire constituting member, said front portion being that portion which is located furthest from said first end of said main shaft.

2. A tire building apparatus as set forth in claim 1, wherein said holder comprises a sleeve fixed to said second end of the main shaft and a disk fixed to an outer surface of the main shaft 3. A tire building apparatus as set forth in claim 2, wherein said grasping pawls comprise L-shaped rocking arms pivotally connected to the disk, each of the rocking arms having one end to be driven by a rotating member rotatable about the main shaft so that when the rotating member is rotated the other end of each of the rocking arms is rocked about the pivoted point, and said grasping pawls further comprise abutting bars fixed to the other ends of the rocking arms so that when the rotating member is rotated the abutting bars are moved in radial directions toward and away from the main shaft.

* * * * *